(12) United States Patent
Khan et al.

(10) Patent No.: US 10,932,012 B2
(45) Date of Patent: Feb. 23, 2021

(54) VIDEO INTEGRATION USING VIDEO INDEXING

(71) Applicant: International Business Machines Corporation, Armonk, NY (US)

(72) Inventors: Azad Khan, Bangalore (IN); Kapish Kumar, Bangalore (IN); Abhinav Radke, Durg (IN); Hemlata Bhatt, Haldwani Nainital (IN); Apoorv Kapse, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 16/195,893

(22) Filed: Nov. 20, 2018

(65) Prior Publication Data

US 2020/0162798 A1    May 21, 2020

(51) Int. Cl.

| G06F 3/0484 | (2013.01) |
| H04N 21/845 | (2011.01) |
| H04N 21/431 | (2011.01) |
| H04N 21/472 | (2011.01) |
| G06F 9/48 | (2006.01) |
| G06N 20/00 | (2019.01) |

(52) U.S. Cl.
CPC ....... *H04N 21/8456* (2013.01); *G06F 3/0484* (2013.01); *G06F 9/48* (2013.01); *H04N 21/4312* (2013.01); *H04N 21/47217* (2013.01); *G06N 20/00* (2019.01)

(58) Field of Classification Search
CPC ..... G06F 3/0484; G06F 9/48; H04N 21/8456; H04N 21/4312; H04N 21/47217; H04N 21/4334; G06N 20/00

USPC .......................................... 386/240; 715/716
See application file for complete search history.

(56) References Cited

U.S. PATENT DOCUMENTS

| 7,878,808 | B1 | 2/2011 | Stumm |
| 9,053,235 | B1* | 6/2015 | Bienkowski ........ G06F 11/3604 |
| 9,569,229 | B1 | 2/2017 | Chen |
| 2006/0134590 | A1 | 6/2006 | Huffman |
| 2008/0288865 | A1 | 11/2008 | Raffel |
| 2010/0215340 | A1 | 8/2010 | Pettit |
| 2011/0052144 | A1* | 3/2011 | Abbas ................. G11B 27/034 |
|  |  |  | 386/240 |
| 2012/0133662 | A1* | 5/2012 | Morris ................. G06F 3/0481 |
|  |  |  | 345/581 |
| 2017/0003945 | A1* | 1/2017 | Bao ........................ H04L 67/34 |

OTHER PUBLICATIONS

"Office Assistant", Wikipedia, This page was last edited on Jun. 18, 2018, at 21:00, 7 pages.
Frisbee, Tyler, "Clippy", Published on Apr 7, 2012, downloaded from the Internet on May 4, 2018, 2 pages, <https://www.youtube.com/watch?v=3G_uCbKoG5A&feature=youtu.be>.

* cited by examiner

*Primary Examiner* — Andrey Belousov
(74) *Attorney, Agent, or Firm* — David B. Woycechowsky

(57) ABSTRACT

A video player that can launch a program from the video player while a video relating to the program (for example, a tutorial video) is being played. Also, a video player that can start a video location at a time location that is determined by a program location currently being executed by a computer program being run by the user. In order to do these things, a mapping is maintained between time ranges in the video and program locations to which the time ranges of the video respectively relate.

20 Claims, 5 Drawing Sheets

| Video Range | Place In The Software | Description |
|---|---|---|
| 0000-1234 | c:\apps\game\level1.exe | Level 1 of the game where the player must answer trivia questions |
| 1235-6667 | c:\apps\game\level2.exe | Level 2 of the game where the player must collect hidden coins |
| 6668-9128 | c:\apps\game\level3.exe | Level 3 of the game where the player must slay the boss |
FIG. 4A
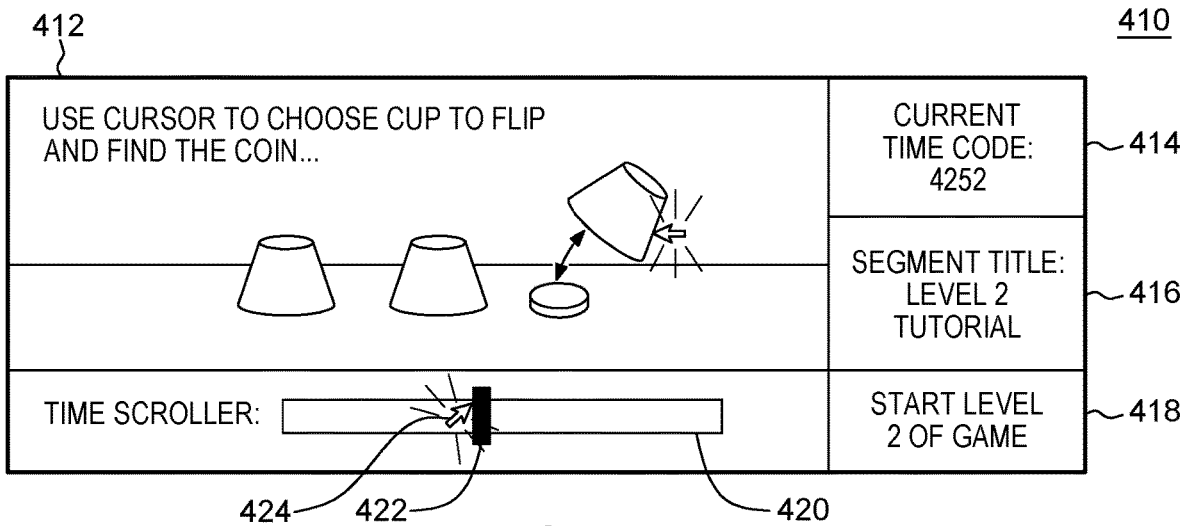
FIG. 4B
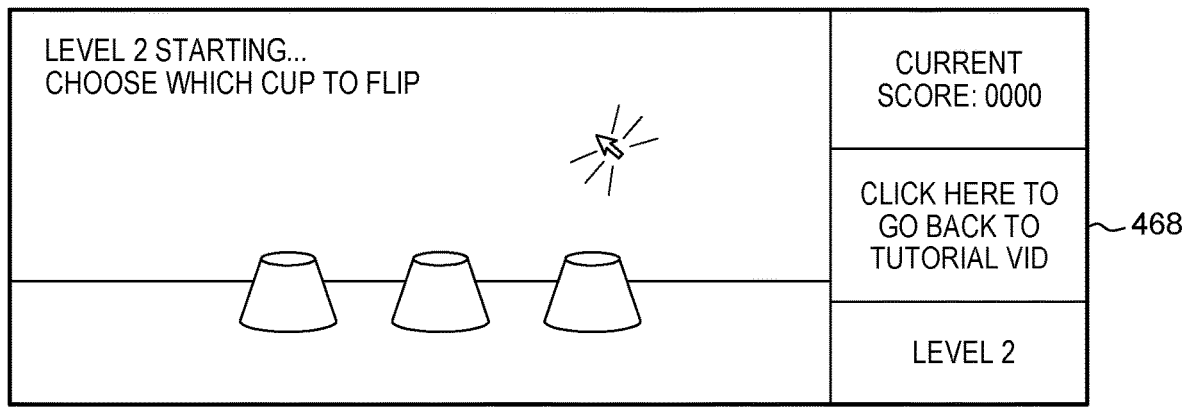
FIG. 4C

VIDEO INTEGRATION USING VIDEO INDEXING

BACKGROUND

The present invention relates generally to the field of video software tutorials that instruct potential users of a software program in the use of the software program.

It is known to have video tutorials that instruct a viewer in the ways of using a software program. As one example, of this, it is known to make videos to teach viewers how to better play a video game program. There are also video tutorials for using various types of business software. Under this kind of technology, a user typically launches the tutorial video in a video player window, and the program to which the tutorial relates in another window (that is, another active program window whose size and visibility and active/inactive status is managed by the computer's operating system). Typically, the user may open these windows in either order—that is, she may start watching the tutorial before taking the needed steps to launch the program window, or, alternatively, she may be using the program in a program window when she opens up the video player and finds and starts the tutorial video file in the video player window. Some users pause the tutorial video in the video player window and then open the active program window to attempt to apply knowledge gained from the tutorial to the user's interactions with the program to which the tutorial relates. Switching back and forth between the video player window and the active program window generally includes several discrete pieces of user input (for example, discrete gestures, screen taps, mouse clicks, mouse drags, keystrokes, etc.) in order to make sure that the appropriate window in open and large enough to interact with.

SUMMARY

One aspect of the present invention is a computer-implemented method (CIM), computer system and/or computer program product for performing the following operations (not necessarily in the following order): (i) receiving a video data set that is playable by video player software to present a video presentation that relates to a first computer program; (ii) receiving a video mapping data set that maps a plurality of time ranges in the video presentation to respectively corresponding program locations in the first computer program; (iii) playing, by the video player software, the video data set to present the video presentation; (iv) during the playing of the video, receiving first user input indicative of a command to jump to program; (v) responsive to the receipt of the first user input, determining a selected time range of the plurality of time ranges in which a time in the video presentation at which the first user input was received; (vi) determining a selected program location using the video data set and the selected time range; and (vii) executing code of the first computer program corresponding to the selected program location.

BRIEF DESCRIPTION OF THE DRAWINGS

FIG. 4A is a video to program mapping table used in conjunction with the first embodiment system;

FIG. 4B is a screenshot of an embodiment of a tutorial video, played by an embodiment of a video player on the first embodiment system;

FIG. 4C is a screen shot of an active program being executed by the first embodiment system;

DETAILED DESCRIPTION

Figure 1:
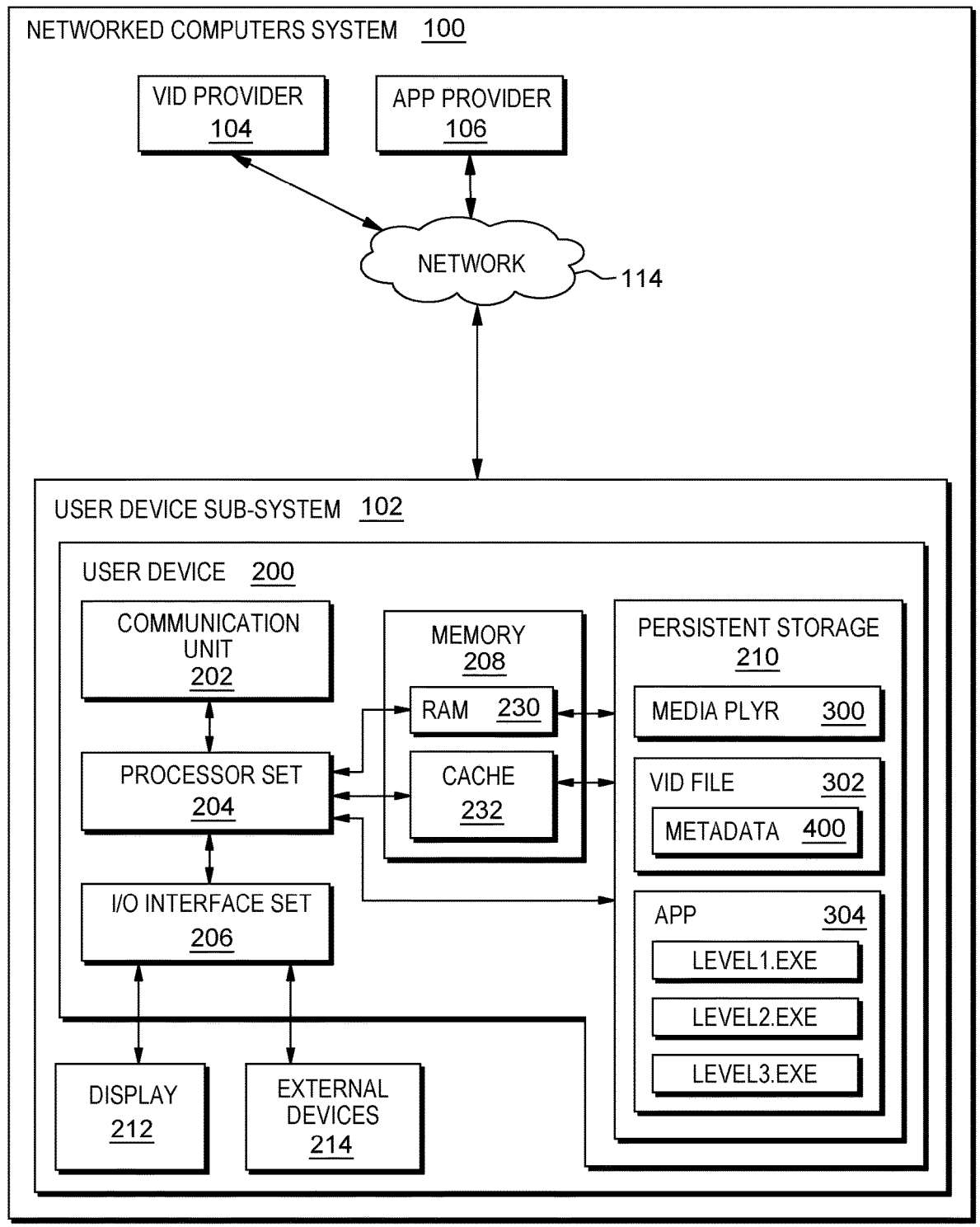
FIG. 1 is a block diagram view of a first embodiment of a system according to the present invention.

Some embodiments of the present invention are directed to a video player that can launch a program from the video player while a video relating to the program (for example, a tutorial video) is being played. Some embodiments of the present invention are directed to a video player that can execute predetermined code in a launched program (that is, an active program) from the video player while a video relating to the program (for example, a tutorial video) is being played. Some embodiments of the present invention can launch the program from the video player and also execute certain predetermined program code of the program (for example, launch and go straight to invocation of a program feature that was being discussed in the tutorial video). In some embodiments, the tutorial video may be part of the program, but in other embodiments the video may be included as a set of data that is separate from the program to which the video relates. In some embodiments, a mapping, or indexing, table will store correlations between time location ranges in the video and different portions of program code to which the time location range of video relates. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: user device sub-system 102 (sometimes herein simply referred to as sub-system 102); video provider sub-system 104; app provider sub-system 106; and communication network 114. Sub-system 102 includes: user device 200; communication unit 202; processor set 204; input/output (I/O) interface set 206; memory device 208; persistent storage device 210; display device 212; external device set 214; random access memory (RAM) devices 230; cache memory device 232; media player program 300; video file 302 (including metadata 400); and game app 304 (including Level1.exe code (no separate reference numeral), Level2.exe code (no separate reference numeral) and Level3.exe code (no separate reference numeral)).

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
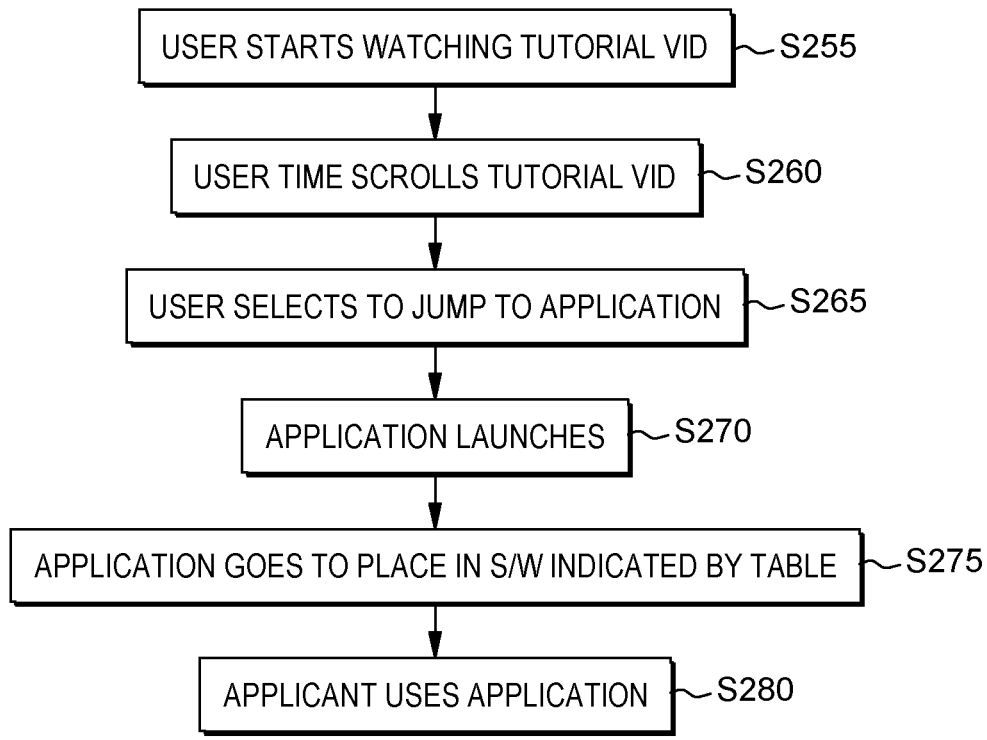
FIG. 2 is a flowchart showing a first embodiment method performed, at least in part, by the first embodiment system.
Figure 3:
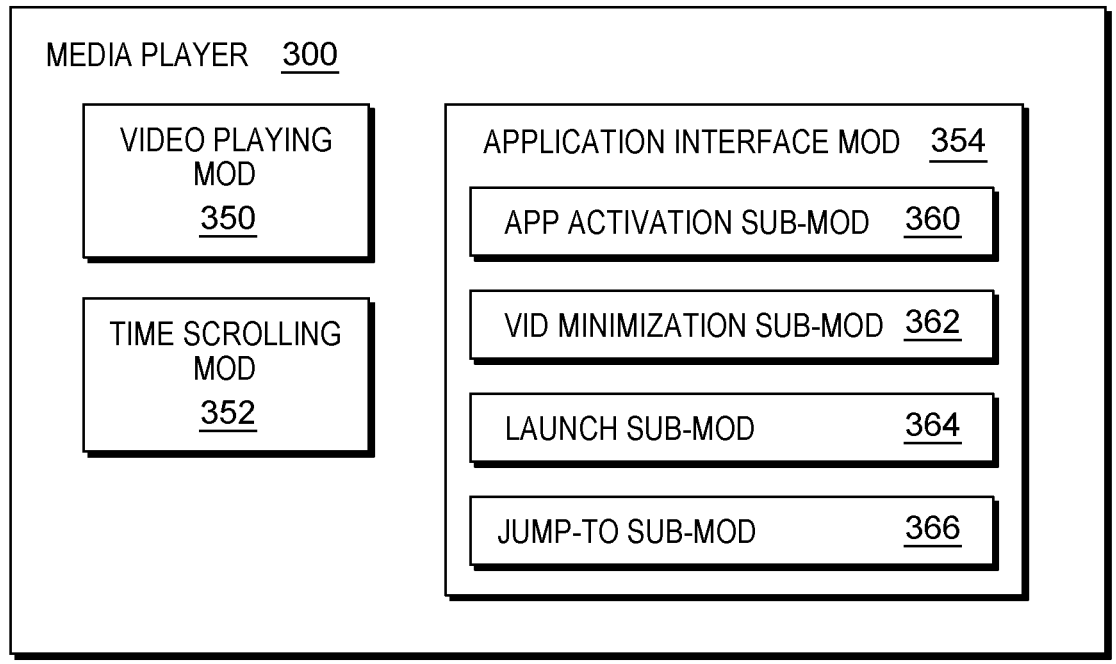
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Prior to starting the method of flowchart 250, user sub-system downloads: (i) video file 302 from video provider sub-system 104 over communication network 114 (see FIG. 1); and (ii) game app 304 from app provider sub-system 106. In this embodiment the video and app (which is a kind of an executable computer program that includes three discrete *.exe files in this example) come from different sources—that is, they are provided by different entities, such as a large corporation for the app and an individual non-profit hobbyist for the video. Alternatively, the video and program (to which the video relates) may come from the same source. In this example, video file 302 is separate from app 304. Alternatively, the video could actually be part of the file, or set of files, that make up the program. In this example, app 304 is a game with three levels of play, respectively corresponding to the three *.exe files shown in FIG. 1 in block 304. Video 302 is a video that gives instructions, tips, tricks, techniques and "cheats" with respect to all three levels of the game. The video of video file 302 is sometimes herein referred to as a "tutorial video."

Processing of the method of flowchart 250 begins at operation S255, where a user starts watching the tutorial video on display 212 of user device sub-system 102 (see FIG. 1). In order to do this, the user communicates through a user interface provided by external devices 214 (for example, a touchscreen and set of buttons) to open media player program 300 and have it play video file 302 by video playing module ("mod") 350 of the media player program. The video can be in any standard format for storing video files, now known or to be developed in the future. In this example, the video is time indexed with index numbers that correspond to tenths of a second. For example, video file starts at index number 0000 (that is, 0 minutes and 0 seconds) and ends at index number 9128 (that is, 15 minutes and 21 seconds). Other index systems are possible. For example, the indexing system may be indirectly based on time by being directly based on video frames that are correlated with time as the video is played sequentially. It is noted that time indexing of videos is a known technology and is conventionally used for operations like allowing a user to jump to some arbitrary point in a video presentation where action of interest starts.

Processing proceeds to operation S260, where the user time scrolls the video presentation to time code 4252. This operation is performed by the user's interactions with time scrolling mod 352 of media player 300. As noted above, time scrolling a video to a portion of interest is not novel in and of itself. In this example, the video is a tutorial for a game (that is, the second level game of game app 304). In this example, the user has time scrolled to this location because she has mastered the first level of the game and portions of the second level, and she wants to learn further about how best to play the second level of the game. Time code 4252 has instructions and the like for the part of level 2 of the game where the user is trying to improve her game play.

A display shown to the user at operation S260 is shown at screenshot 410 of FIG. 4B. Screenshot 410 includes: video presentation region 412; current time code display region 414; video segment title region 416; jump-to-program region 418; scroll bar display 420; adjustable scroller display 422; and active cursor 424. The user has manipulated active cursor 424 so that adjustable scroller display 420 is positioned relative to scroller bar display 422 to correspond to time code 4252 (that is, the video portion of interest). Alternatively, other types of user interfaces (now known or to be developed in the future) could be used to allow the time position of the video to be controlled by the user's input. Because the video is a game tutorial there is another cursor shown in video presentation region 412 but is not an active cursor and is merely part of the video because the video is showing the user good ways to manipulate the cursor in the game during actual game play.

Processing proceeds to operation S265, where the user clicks on jump-to-program region 418 to start playing the game at level 2 (that is, the level being discussed in the video at time codes 4252 et. seq.) In this example, providing jump-to-program type user input through the media player both launches the program to which the video relates, and, also, jumps to a "location in the program" (that is a predetermined piece of program code) to which the portion of the video being watched more specifically relates. More specifically: (i) the launching of the program is performed at operation S270 of flowchart 250 by app activation sub-mod 360 of application interface mode 354 of media player 300; and (ii) the jumping to level 2 of the game (that is, program location level2.exe of app 304 (see FIG. 1) is performed at operation S275 by jump-to sub-mod 366 of application interface mod 354 of media player 300.

Alternatively, some embodiments may merely launch the program without jumping to any particular portion of code in the program. As a further alternative, some embodiments may only be able to properly work when the program is already launched, and the jump-to-program function merely starts a predetermined piece of program code in the active program based on the time location within the video at the time the jump-to-program function is activated.

In this example, the program is a game program. However, various embodiments of the present invention may be applied to other types of programs, as will be discussed in detail in the following sub-section of this detailed description section. In this example, the video is a tutorial. However, other types of video, that is related to a program (for example advertising video that advertises an eBook program), could be used. In this example, the "location in the program" is a part of the program flow in a program that has a sequential flow (that is, level 1 of the game, then level 2 of the game and then level 3 of the game and then the game is over). In this example, two features of the jump-to-program function is that it both starts the program, and also that it starts the program in a way such that level 1 is skipped. Both of these features enhance the user experience because the video portion relating to level 2 play is fresh in the user's mind, so the user doesn't have to spend time starting up the game and/or playing level 1. Although, at first impression, this may seem like a small thing, it is actually a powerful feature because the time and effort that a user would otherwise spend in booting up the game and playing through level 1 can cause the user to forget fine points of play that the user has just seen in the video. In this sense, the jump-to-program feature makes the user's use of the video and the use of the app a more seamless and integrated user experience.

Returning to a discussion of operation S275, jump-to sub-mod 366 uses table 400 (see FIG. 4A) to determine that program location level2.exe of app 304 is the appropriate program location to which to jump. As shown in FIG. 4A, table 400 is a table with fields for: (i) video time code range; (ii) program location (in this example, given in terms of a file path to the appropriate *.exe file); and (iii) a description of what happens at the program location. In this example, when the user clicks on the jump-to-program button, the time code is 4252 (see FIG. 4B). This means that the applicable record in table 400 is the record corresponding to time code range 1235 to 6667 (that is, the second record in the table). This record specifies the program location of C:\apps\game\level2.exe, which corresponds to level2exe of app 304 (see FIG. 1) and to level 2 of the game playing experience. Other ways of specifying the program location, other than file path, could be used, such as specifying a line of code, or linking to executable code that dynamically determines a program location.

Processing proceeds to operation S280, where: (i) video minimization sub-mod 362 of application interface mod 354 of media player 300 minimizes the video window and pauses the play of the video; and (ii) launch sub-mod 364 opens up a window to display the game that has been activated at program location level 2 at operation S275. The display now presented to the user is shown at screen shot 450 in FIG. 4C. As shown in screen shot 450, there is a jump-to-video button 468 that allows a user to jump back into the video tutorial. In this example, clicking on button 468 will put the user back into the tutorial video at the time location where the user left off when the user previously clicked on the jump-to-program button. Alternatively, this function could consult table 400 to determine a location in the video based on the program location being executed at the time the jump-to-video function is selected during game play. In this example, jumping to video pauses game play.

The foregoing example of flowchart 250 is an example, where the "program locations" are points in a program that has sequential flow (level 1 to level 2 to level 3). Program location of the type that correspond to a location in the sequential flow of a sequentially flowing program are sometimes herein more specifically referred to as sequential-flow type program locations.

Another type of "program location" is a function type program location. An example using function type program locations will be discussed in the following paragraphs. In many of these examples, there is a word processing program running such that the user is editing a document that is being created by the user.

FIRST COMPUTER PROGRAM FUNCTION BASED EXAMPLE. When the user is watching a video to "Convert word Files to PDF Documents", then on clicking to launch the application from the video, the screen containing the "Save as PDF" will be opened in word. In this example, the program location is the code in the word processing program that implements the save-as-PDF function.

SECOND PROGRAM FUNCTION BASED EXAMPLE. When the user is watching a video to "Create a Bulleted List," then on clicking to launch the application from the video, the screen containing the button to create the bullet list will be displayed. In this example, the program location is the code in the word processing program that implements the create-a-bulleted list function.

THIRD PROGRAM FUNCTION BASED EXAMPLE. When the user is watching a video to "Insert an image", then on clicking to launch the application from the video, the screen containing the button to insert an image into a word processing document. In this example, the program location is the code in the word processing program that implements the insert-an-image function.

FOURTH PROGRAM FUNCTION BASED EXAMPLE. When the user is watching a video to "have a smart lookup," then on clicking to launch the application from the video, the smart lookup screen will be opened for the selected word. In this example, the program location is the code in the word processing program that implements the smart lookup function.

FIFTH PROGRAM FUNCTION BASED EXAMPLE. When the user is watching a video to "check compatibility," then on clicking to launch the application from the video, the screen containing the check compatibility will be displayed. In this example, the program location is the code in the word processing program that implements the compatibility check function.

SIXTH PROGRAM FUNCTION BASED EXAMPLE. When the user is watching a video to "see the list of auto-recovered documents", then on clicking to launch the application from the video, the screen containing the button to open auto recovered button will be displayed. In this example, the program location is the code in the word processing program that implements the auto recovery function.

SEVENTH PROGRAM FUNCTION BASED EXAMPLE. When the user is watching a video to "underline/italicized/bold a word," then on clicking to launch the application from the video, the corresponding screen in application will be displayed. In this example, the program location is the code in the word processing program that implements the text formatting function.

EIGHTH PROGRAM FUNCTION BASED EXAMPLE. When the user is watching a video to "add the calculator to the home screen," then on clicking to launch the application from the video, the add toolbar screen will be opened.

NINTH PROGRAM FUNCTION BASED EXAMPLE. When the user is watching a video to "auto-insert date and time," then on clicking to launch the application from the video, the corresponding screen will be opened.

TENTH PROGRAM FUNCTION BASED EXAMPLE. When the user is watching a video to "Convert from Word to HTML," then on clicking to launch the application from the video, the corresponding save as screen will be opened. In this example, the program location is the code in the word processing program that implements the convert-to-HTML function.

ELEVENTH PROGRAM FUNCTION BASED EXAMPLE. When the user is watching a video to "capitalize the words," then on clicking to launch the application from the video, the corresponding screen will be opened. In this example, the program location is the code in the word processing program that implements the capitalize-words function.

TWELFTH PROGRAM FUNCTION BASED EXAMPLE. When the user is watching a video to "copy formatting", then on clicking to launch the application from the video, the corresponding screen will be opened. In this example, the program location is the code in the word processing program that implements the copy formatting function.

THIRTEENTH PROGRAM FUNCTION BASED EXAMPLE. When the user is watching a video to "change the paragraph spacing and breaks," then on clicking to launch the application from the video, the corresponding screen will be opened. In this example, the program location is the code in the word processing program that implements the save-as-PDF function. In this example, the program location is the code in the word processing program that implements the paragraph formatting function.

FOURTEENTH PROGRAM FUNCTION BASED EXAMPLE. When the user is watching a video to "crop an image," then on clicking to launch the application from the video, the corresponding screen will be opened.

FIFTEENTH PROGRAM FUNCTION BASED EXAMPLE. When the user is watching a video to track the "changes in the file," then on clicking to launch the application from the video, corresponding screen will be opened. In this example, the program location is the code in the word processing program that implements the track changes function.

III. Further Comments and/or Embodiments

Some embodiments of the present invention recognize the following facts, potential problems and/or potential areas for improvement with respect to the current state of the art: (i) the world is changing into a place where everybody is linked to the computer in some way or other; (ii) people from labor to fashion industry typically depend upon their computers and the software these computers run; (iii) for example: (a) spreadsheet applications are used in almost every situation where a list is involved, (b) database applications are used to store data useful to and/or related to huge numbers of people worldwide, and (c) cognitive computing and/or artificial intelligence type computers are capable of helping: (1) medical experts to diagnosis health conditions, and (2) the fashion experts in their designing of clothing and accessories; (iv) even for a person who is not directly involved with computers through their employment are still typically connected into the digital world using mobiles/smartphones, tablets and the like; (v) there are lot of application for almost everything in mobile—from casual games to productive apps; and/or (vi) mobile users typically have multiple options for doing accomplishing computing and/or communications of various types.

Some embodiments of the present invention recognize the following facts, potential problems and/or potential areas for improvement with respect to the current state of the art: (i) two potential issues that increase in importance with increased dependency and availability of the software: (a) education, which typically involves educating the people about the use of complex software (this applies to software engineers or anybody who uses software directly), and (b) promotion, which typically involves making a software to be used by someone is a difficult task; (ii) people tend to do what they feel is good and that depends on numerous situation specific circumstances, which circumstances cannot always be foreseen by software designers; (iii) there is a stiff competition among the developers to attract customers; (iv) an efficient way of educating/promotion is through learning/promotional videos; (v) the videos can use graphics which has the maximum impact to memory which is one of the critical factor when anyone is learning or when promotion is required; (vi) a potential problem with videos is that even though they are attractive, they are typically not directly connected to the application; (vii) typically, instructional and promotional videos and application are two discrete entities that are not yet brought together; (viii) while watching a video on some feature of a particular spreadsheet program, the user typically has to use a separate interface to actually interact with an actual spreadsheet; and/or (ix) there are numerous features in a typical spreadsheet program, like macros and functions and for learning any of these features, the user has to watch a video, pause, go to the terminal with excel installed and then practice the same.

To mention another example similar to item (ix) in the list of the previous paragraph, if a user wants to try a new game launched in the market, he needs to first watch the game promotional video. Based on that, the user will download the demo, install in her system and then will play the game to find the gameplay experience. To mention another example similar to item (ix) in the list of the previous paragraph, an e-book consumer, after seeing a book promotion video, has to go to the e-book sellers website or app, download a desirous e-book and read the sample/actual book to read. In these examples, there is a dependency on video for attracting a large bunch of users, but the video is disconnected from the application to which the video relates. Some embodiments of the present invention may address the foregoing issues and opportunities for improvement by more closely integrating software applications and videos that respectively relate to the same.

Some embodiments of the present invention may include one, or more, of the following features, characteristics and/or advantages: (i) one file can be used to integrate both the video and an application; (ii) an "indexing pattern" is used to go to particular location in the application; (iii) a media player that will be able.to able to launch an application by clicking on video via keyboard or other input sources; (iv) a media player to be able to play video and launch application; (v) build process to merge video and application; (vi) use the interface of the media player to override with the application interface; (vii) interoperable video and application interfere in the same output terminal; (viii) markers for application which will enable them to be marked with certain index of the video and get launched at that interface; (ix) readable and writable memory containing the markers of an application which will be attached to video indexes and can be modified for different videos; and/or (x) the build process to generate markers for the video.

Some embodiments of the present invention may include one, or more, of the following features, characteristics and/or advantages: (i) the integration of a video and application is done by merging the video and application together into a single file; (ii) a typical organization of the video file contains the Metadata plus Audio plus Video plus Indexing (which is used to identify the specific parts in the video like when we scroll or seek forward or backward); (iii) the media players are able to read the data inside the media file and then using the graphics engine process plus an arithmetic logic unit (ALU), render the video content on the screen and audio content to the speakers or audio outputs; and/or (iv) the player can also be controlled using the keyboard or other input devices via various interfaces.

The various types of data included in a "video integrated application file" formed and formatted according to an embodiment of the invention will now be identified: (i) metadata contains the details of the video and the application present in the file; (ii) audio data—the audio part of the integrated video(s); (iii) video data—the graphic/visual data of the integrated video(s) (the audio and video data may be very closely intermingled); (iv) indexing data—to help locate metadata, video data and/or audio data within the video integrate application file; (v) application implementation data—data and instructions for driving operation of the application (for example, a spreadsheet or a document editing program); and (vi) player implementation data—data and instructions for driving operation of a video player is used to play the content represented by the audio and video data (in this embodiment, the video has a capability of launching the application within the file being played.

Further with respect to the indexing data described in the previous paragraph, in this embodiment: (i) the indexing system enables the users to go to a particular part of the video and the video/audio at that corresponding position played; and (ii) the new indexing will also be able to identify the audio and video part of the application, but it also contains specific part of the application.

Here are few examples from different fields in which various embodiments of the present invention may be applicable: (i) a user watching a game trailer if finds something that attracted him and he wanted to experience the gameplay, the user can pause the video at any time to proceed to play the game—the game will be launched at the same location that the user was watching in the video; (ii) a user watching a spreadsheet learning video can pause at macros and choose to launch the spreadsheet functionality of the spreadsheet program at that point—the user will be presented with a macros screen where she can practice macros—if the user, after practicing the macros, wants to return to the video, she can do so and the video will be resumed from the point where she previously paused the video; and (iii) a user watching a book promotion video on pausing the screen will be presented with an option to read the sample, that will be opened directly by just choosing to read the sample, or the user can buy the book online.

Detailed implementation and flow diagrams of various parts of some embodiment(s) of the present invention will be described below.

Components of an embodiment of the present invention include: (i) video data (including intermingled audio data in this embodiment); (ii) application data (including computer readable instructions) for the application that needs to be integrated; (iii) indexing data; (iv) an integration tool component that includes an integration engine that includes a graphical processor that has the tools to: (a) process video data, (b) process the audio data, (c) read the index of the video and the audio. and (d) merge the video data, the application data and the indexing created into a single file; and (v) an application processor (to be discussed in detail in the following paragraph).

One function performed by the application processor is the creation of markers that point to different parts of the application. This can be implemented as executable parts of a relatively large data component like the application data portion of a spreadsheet program or a presentation (slide show) creation program. Alternatively, this can be implemented as a relatively small component in a software like macros and/or functions conventionally included in certain commercially available spreadsheet programs, word processing programs, etc. The marker id can uniquely identify each and every library in an application. In this embodiment, the tools will use the machine learning to do the following: (i) go through the application and identify the different library available in the application; (ii) if the build files are available to the application it can read the build files to identify the different library; (iii) in case a standalone application is present with only one library, the individual components in the GUI (graphical user interface) will be decoded and its functionality can also be read via the manuals that comes with the product; (iv) once it clearly identifies the different parts of the application it will assign unique ids to each; (v) the indexing in the video will be used and the video itself will be ground in categories that will point to each and every application library markers identified above; (vi) the manual process where the user can seek to a particular part in the video and also assign the corresponding library in a GUI fashion can also be done in case the machine allocation does satisfied; and (vii) once the markers are done, the index and its group in the video will be hashed with it and this list will be attached with the final file that will be used to find which library in application needs to be launched.

In some embodiments, a pre-existing media player program is used to play video(s) embedded in the integrated application/video file. However, a conventional media player may need to be augmented with data and instructions so that it can read the indexing data, included in the integrated application/video file, which points to the various application portion(s) and the various audio/video data portion(s). In some embodiments, when a user does not select the application, the video will be played in its entirety (and in some embodiments, it may be automatically looped). If the user chooses to play the application, the media player may use the indexing data to find an appropriate application data and launch that portion of the application (for example, launch a new spreadsheet tab) in the same window in the GUI where the video was playing and/or would have played.

Figure 5:
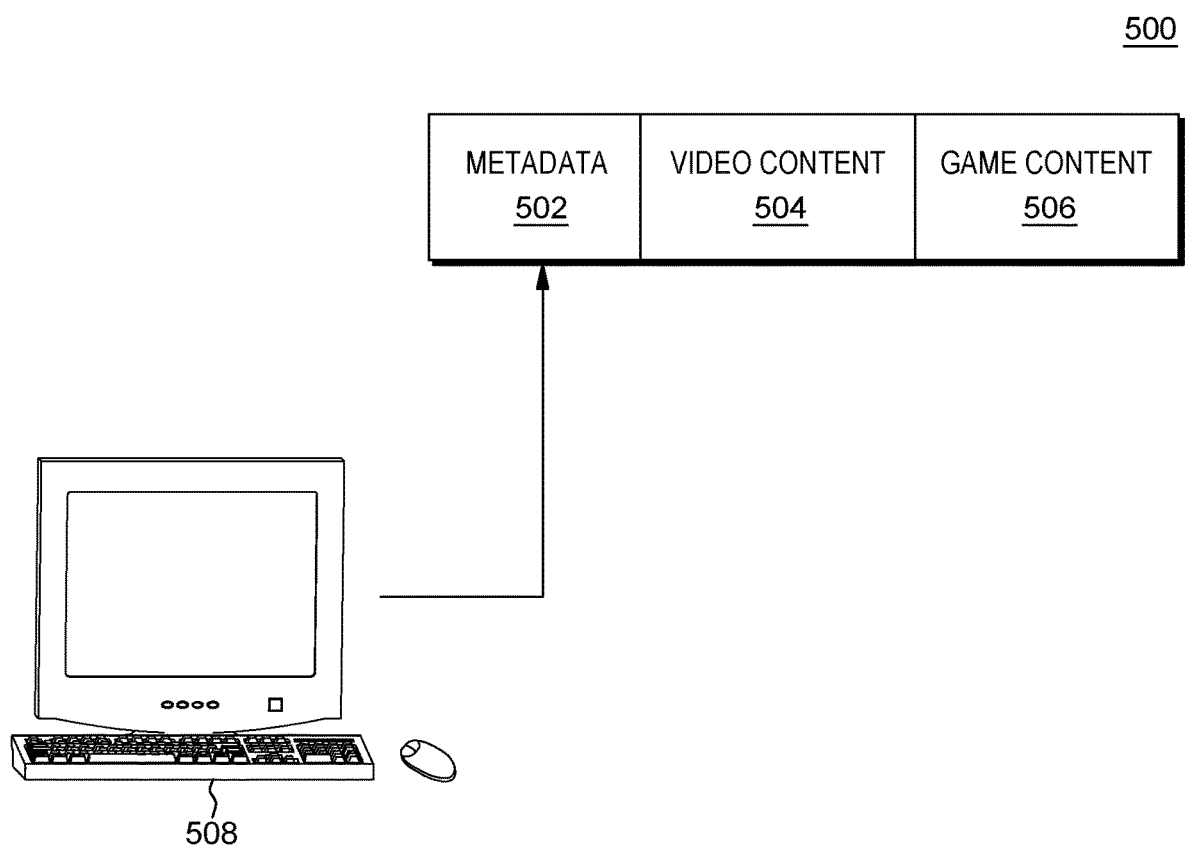
FIG. 5 is a block diagram view of a second embodiment of a system according to the present invention.

FIG. 5 shows block diagram of system 500, including: metadata 502 of integrated video/application file; video content (including audio content) 504 of integrated video/application file; game content 506 (also called application content) of integrated video/application file; and computer device 508 (including an operating system, not separately shown). The operating system of computer device 508 can read the metadata to selectively access the video content and the game content, as process flow between a user's viewing of video(s) and the user's use of the game application demands.

Figure 6:
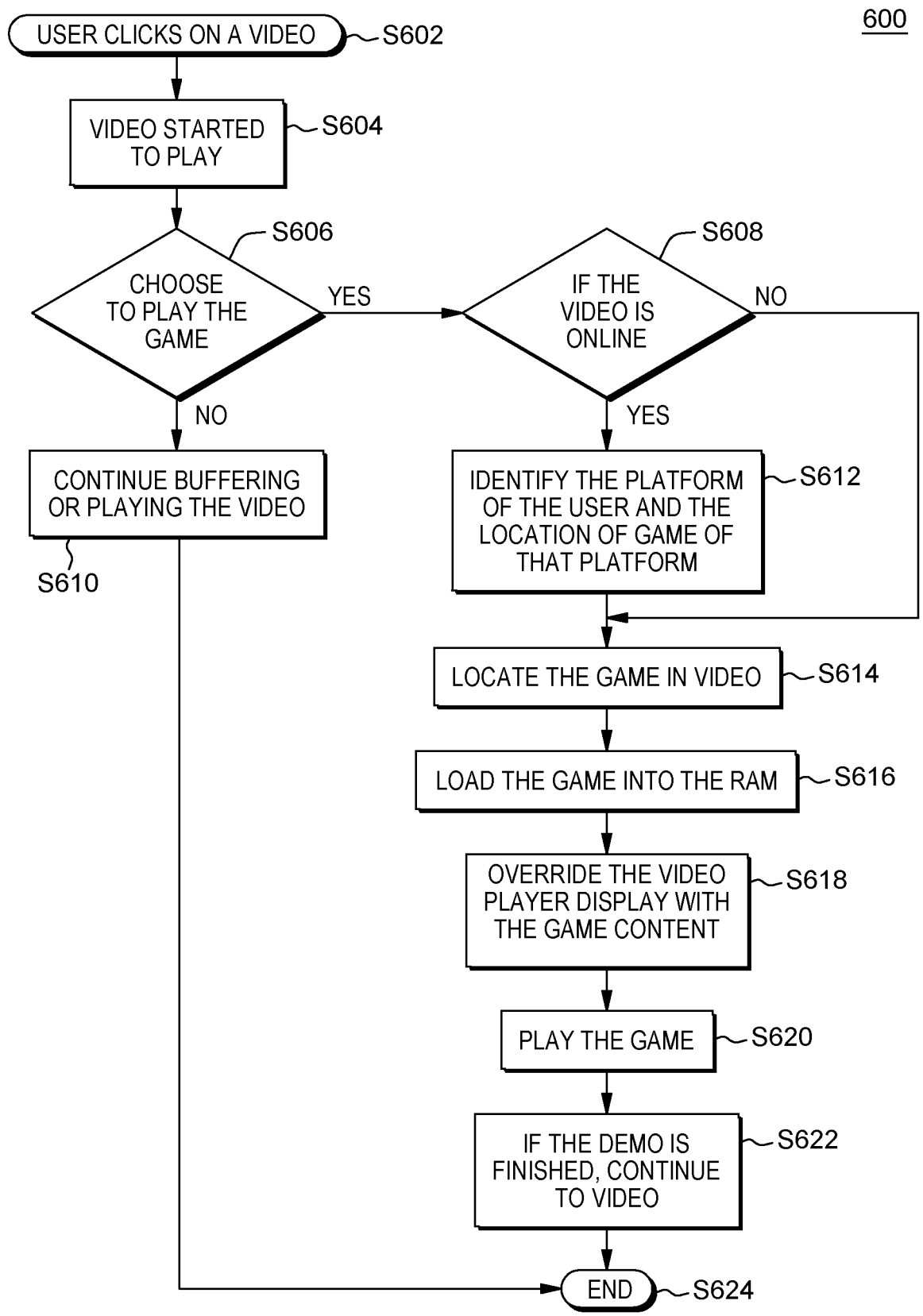
FIG. 6 is a flowchart showing a second embodiment method performed, at least in part, by the second embodiment system.

FIG. 6 is a flowchart representing method 600 for running an integrated application/video file according to a gaming embodiment of the present invention. Method 600 includes the following operations (with process flow among and between the operations as shown in FIG. 6): S602; S604; S606; S608; S610; S612; S614; S616; S618; S620; S622; and S624.

Some embodiments of the present invention may include one, or more, of the following features, characteristics and/or advantages: (i) integration of a video and application is done by merging the video and application together into a single file; (ii) uses machine learning (ML) to integrate application data with audio-video data; (iii) uses a real application; (iv) creates indexes from the code; (v) links the indexing data for the video(s) and the code for going to the correct location of the video; (vi) uses a real application not a simulated application; (vii) merges the index of the video and the indexes it creates while browsing through the code using machine learning; (viii) audio and video data are actually located in the application file and not mere linked by a reference (that is, a "link") in the application file; (ix) the video data and the audio data is merged with the application data by machine logic, rather than by manual entry by a human coder; and/or (x) the video data and the audio data is merged with the application data based on machine learning.

Some embodiments of the present invention may include one, or more, of the following features, characteristics and/or advantages: (i) adding interactive segments to promotional/education videos to bring about a live experience to the user on what the user is watching; (ii) when watching a game promo, the live experience could be playing the game trail within the game ad video; and/or (iii) while learning something (a software tool), the live experience could be working with that tool within a video.

Some embodiments of the present invention may represent a technological improvement for at least one, or more, of the following reasons: (i) it provides machine learning abilities to better understand a video content and its emotions; (ii) it helps to better understand a product by analyzing its machine code using machine learning; (iii) it helps to connect a software with a video in a way which directly links the video content with the machine code; and (iv) can help in understand and creating numerous video content for existing products.

Some embodiments of the present invention may represent a specific improvement in computer capabilities and not an idea where computers are invoked merely as a tool for at least one, or more, of the following reasons: (i) better understand and identify the content and context of a video; (ii) machine logic that connects the contextual and high level content of a video to the machine code and hence helps to have a look at the software simultaneously as a tool and a code; and (iii) helps decrypt the machine language into a very high level language and attach context to it which a user can view in the form of attractive graphics.

Some embodiments of the present invention may include one, or more, of the following features, characteristics and/or advantages: (i) not based on script, not prewritten and actions are not pre-defined; (ii) exploits the use of machine learning to understand the code and the video content and then use the indexing in the video to point places in the software; (iii) an application and its corresponding GUI presented as a video; (iv) use scroll in a media player so that the video at the corresponding time is played—this is achieved using the indexing and by identifying the data in the media file based on the time; and/or (v) the index can be anything which reduces the time required to fetch the content from filesystem (like the database index used to locate the location of table data in the database filesystem).

Some embodiments of the present invention may include one, or more, of the following features, characteristics and/or advantages: (i) a video which contains multiple frames and while watching the video, user will have an option to switch to corresponding application in the running video frame only; (ii) syncing of frame when user is going to pause the video and application will get open to same place which is related to paused frame inside video; (iii) uses the video index to identify the places inside the software (that is, the underneath code of the GUI which is shown in the video); (iv) when the user is going to open the corresponding application from the running video, the application will get open to a place which is related to paused video; (v) getting open to the correct place in the software is performed via a video index which will move into the actual written code for the application and hit the place where paused video frame and application will match; (vi) if a user is watching a video on how to perform a function of the application (for example, the writing of macros for the application, then on choosing to click on a portion the video relating to that function will activate the function in the video (in this example, the macro writing function); (vii) helpful in the situation where a user want to switch frequently between actual application and the video (for example, learning from a video and practicing); and/or (xiii) potentially applicable to various types of applications, such as spreadsheet programs, word processing programs, games and online book reader applications.

In one embodiment of the present invention, a User A wants to sell his newly built application. Once the application is built, User A makes an advertisement and can provide a demo version of User A's application. This advertisement can be in the form of video. So, using currently conventional techniques: (i) there will be a separate video advertisement which will give product overview and its benefit; (ii) later, there will be a link to download the demo of product. On the other hand, under this embodiment of the present invention, an end user of User A's application will get a facility to watch the video as well as open the application in the video itself.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving a video data set that is playable by video player software to present a video presentation that relates to a first computer program;
receiving a video mapping data set that maps a plurality of time ranges in the video presentation to a respectively corresponding plurality of file paths, with each file path of the plurality of file paths being respectively associated with different program locations in the first computer program, with each program location corresponding to a different location in a program flow defined by code of the first computer program;
playing, by the video player software, the video data set to present the video presentation;
during the playing of the video, receiving first user input indicative of a command to jump to program;
responsive to the receipt of the first user input, determining a selected time range of the plurality of time ranges in which a time in the video presentation at which the first user input was received;
determining a selected file path using the video data set and the selected time range; and
executing the code of the first computer program at the program location associated with the selected file path.

2. The CIM of claim 1 wherein:
the first computer program has a linear program flow; and
the plurality of file paths respectively correspond to code locations in code of the first computer program corresponding to locations in the program flow of the first computer program.

3. The CIM of claim 1 wherein:
the first computer program includes a plurality of program functions; and
the plurality of file paths respectively correspond to code locations in code of the first computer program that correspond to program functions of the plurality of program functions.

4. The CIM of claim 1 wherein the first computer program is one of the following types of computer program: spreadsheet program, word processing programs, game or online book reader application.

5. The CIM of claim 1 wherein the video presentation is a video tutorial relating to the first computer program.

6. The CIM of claim 1 further comprising:
integrating both the video presentation and the first computer program into one file.

7. The CIM of claim 1 further comprising:
using machine learning to make an addition of or revision to a mapping in the data of the video mapping data set.

8. A computer-implemented method (CIM) comprising:
receiving a video data set that is playable by video player software to present a video presentation that relates to a first computer program;
receiving a video mapping data set that maps a plurality of time ranges in the video presentation to a respectively corresponding plurality of executable links included in the first computer program, with each executable links of the plurality of executable links respectively providing a link to executable code that dynamically determines a line of code of a plurality of lines of code in the first computer program, with each line of code of the first computer program corresponding to a different program location in the first computer program, and each program location corresponding to a different location in a program flow defined by code of the first computer program;
playing, by the video player software, the video data set to present the video presentation;
during the playing of the video, receiving first user input indicative of a command to jump to program;
responsive to the receipt of the first user input, determining a selected time range of the plurality of time ranges in which a time in the video presentation at which the first user input was received;
executing the executable link corresponding to the selected time range to determine a selected line of code from the plurality of lines of code; and
executing the code of the first computer program at the selected line of code.

9. The CIM of claim 8 wherein the first computer program has a linear program flow.

10. The CIM of claim 8 wherein:
the first computer program includes a plurality of program functions; and
the selected line of code corresponds to a starting point of a selected program function of the plurality of program functions.

11. The CIM of claim 8 wherein the first computer program is one of the following types of computer program: spreadsheet program, word processing programs, game or online book reader application.

12. The CIM of claim 8 wherein the video presentation is a video tutorial relating to the first computer program.

13. The CIM of claim 8 further comprising:
integrating both the video presentation and the first computer program into one file.

14. The CIM of claim 8 further comprising:
using machine learning to make an addition of or revision to a mapping in the data of the video mapping data set.

15. A computer-implemented method (CIM) comprising:
receiving a video data set that is playable by video player software to present a video presentation that relates to a first computer program;
receiving a video mapping data set that maps a plurality of time ranges in the video presentation to a respectively corresponding plurality of lines of code included in the first computer program, with each line of code of the plurality of lines of code being respectively associated with different program locations in the first computer program;
playing, by the video player software, the video data set to present the video presentation;
during the playing of the video, receiving first user input indicative of a command to jump to program;
responsive to the receipt of the first user input, determining a selected time range of the plurality of time ranges in which a time in the video presentation at which the first user input was received;
determining a selected line of code from the plurality of lines of code using the video data set and the selected time range, with each line of code of the first computer program corresponding to a different program location in the first computer program, and each program location corresponding to a different location in a program flow defined by the code of the first computer program; and
executing the code of the first computer program at the selected line of code.

16. The CIM of claim 15 wherein the first computer program has a linear program flow.

17. The CIM of claim 15 wherein:
the first computer program includes a plurality of program functions; and
the plurality of lines of code respectively correspond to program functions of the plurality of program functions.

18. The CIM of claim 15 wherein the first computer program is one of the following types of computer program: spreadsheet program, word processing programs, game or online book reader application.

19. The CIM of claim 15 wherein the video presentation is a video tutorial relating to the first computer program.

20. The CIM of claim 15 further comprising:
integrating both the video presentation and the first computer program into one file.

* * * * *